United States Patent
Kuo et al.

(10) Patent No.: US 7,793,776 B2
(45) Date of Patent: Sep. 14, 2010

(54) TRANSMISSION DEVICE FOR SCANNER

(75) Inventors: Ping-Hung Kuo, Taoyuan Hsien (TW);
Ke-Wei Chen, Taoyuan Hsien (TW);
Sheng-Tsung Shiao, Taoyuan Hsien (TW)

(73) Assignee: Teco Image System Co., Ltd., Taipei (TW)

( * ) Notice: Subject to any disclaimer, the term of this patent is extended or adjusted under 35 U.S.C. 154(b) by 831 days.

(21) Appl. No.: 11/687,546

(22) Filed: Mar. 16, 2007

(65) Prior Publication Data

US 2008/0142338 A1 Jun. 19, 2008

(30) Foreign Application Priority Data

Dec. 19, 2006 (TW) .............................. 95147714 A

(51) Int. Cl.
*B65G 39/10* (2006.01)

(52) U.S. Cl. ....................................... 198/842; 399/155

(58) Field of Classification Search ................ 198/780, 198/782, 832, 837, 842; 399/155, 467, 303
See application file for complete search history.

(56) References Cited

U.S. PATENT DOCUMENTS

| | | | | |
|---|---|---|---|---|
| 4,031,816 A * | 6/1977 | Matsuo | ........................ | 493/373 |
| 4,537,302 A * | 8/1985 | Gsponer et al. | .......... | 198/626.4 |
| 4,760,913 A * | 8/1988 | Tschantz | .................... | 198/819 |
| 4,819,811 A * | 4/1989 | Ewing et al. | ................. | 209/699 |
| 4,832,205 A * | 5/1989 | Backus | ........................ | 209/620 |
| 4,875,573 A * | 10/1989 | Wiseman | ..................... | 198/831 |
| 4,978,000 A * | 12/1990 | Mohr | .......................... | 198/641 |
| 5,196,870 A * | 3/1993 | Itoh et al. | ................... | 347/130 |
| 5,461,463 A * | 10/1995 | Iwama | ......................... | 399/154 |
| 5,488,452 A * | 1/1996 | Iwama | ........................... | 399/1 |
| 5,501,235 A * | 3/1996 | Watanabe | .................. | 131/84.1 |
| 5,626,337 A * | 5/1997 | Iseki | ........................... | 271/198 |
| 5,748,217 A * | 5/1998 | Bliss | .......................... | 347/141 |
| 5,819,133 A * | 10/1998 | Matsuzoe et al. | ............. | 399/66 |
| 5,904,240 A * | 5/1999 | Pax et al. | ..................... | 198/841 |
| 5,999,774 A * | 12/1999 | Masuda et al. | .............. | 399/155 |
| 6,505,026 B2 * | 1/2003 | Hayakawa et al. | .......... | 399/303 |
| 6,520,321 B2 * | 2/2003 | Thurston et al. | ............ | 198/813 |
| 7,131,531 B1 * | 11/2006 | Ryan | .......................... | 198/842 |

\* cited by examiner

*Primary Examiner*—Douglas A Hess
(74) *Attorney, Agent, or Firm*—Rabin & Berdo, P.C.

(57) ABSTRACT

An image acquisition module in a transmission device for a scanner is installed in a base of the scanner, a rotating wheel and a first roller are pivotally connected onto two inner sides of the base, and a driving roller is installed below the first roller. A conveyor is respectively put around the rotating wheel, the first roller and the driving roller, and a second roller is pivotally connected onto a place between the rotating and the driving roller and used for withstanding the conveyor between the rotating wheel and the driving roller to allow the conveyor between the rotating wheel and the second roller to be parallel to the conveyor between the rotating wheel and the first roller, and the conveyor is driven by the driving roller to drive the image acquisition module to move.

6 Claims, 5 Drawing Sheets

TRANSMISSION DEVICE FOR SCANNER

BACKGROUND OF THE INVENTION

1. Cross-References to Related Applications

This non-provisional application claims priority under 35 U.S.C. §119(a) on Patent Application No(s). 95147714 filed in Taiwan, R.O.C. on Dec. 19, 2006, the entire contents of which are hereby incorporated by reference.

2. Field of the Invention

The present invention relates to a transmission device, and more particularly to a transmission device for a scanner.

3. Description of Related Art

Accompanying the development of technology, a scanner has already become a common computer peripheral facility and is even built in a multi-functional business machine to provide a manuscript scanning function. It is mainly to use an image acquisition apparatus inside the scanner to pick up graphs, images, characters and etc of a manuscript, convert them to digital signals and then transmit them to a computer to be processed therein.

Please refer to FIGS. 1 and 2. A transmission mechanism of a conventional scanner is installed in a base A1 of the scanner; the transmission mechanism A2 comprises a conveyor device A21 and a rotating motor A22, in which the conveyor is constituted by an active roller A211, a passive roller A212 and a loop-typed conveyor A213, the loop-typed conveyor A213 is respectively put around the active roller A211 and the passive roller A212 so as to use the conveyor device A21 to drive the image acquisition device A3 to move to and fro in the base A1 of the scanner to process scanning on manuscript images.

Because the conventional transmission mechanism is limited to the size of the image acquisition device A3 plus the positions of the rotating motor A22 and the active roller A211, when the image acquisition device A3 is moved in the base A1, for preventing the image acquisition device A3 from striking and damaging the active roller A211 while being moved, it causes the image acquisition device A# not to be too close to the active roller A211 and a distance taken as a buffer space to be necessary to remain between the image acquisition device and the base A1; this results in the waste on space so as to cause the volume of the scanner to be increased.

From the description mentioned above it can be known that how to reduce the volume of a scanner to allow the scanner to be lighter to elevate the use convenience is the topic that those skilled in the art need to improve urgently.

SUMMARY OF THE INVENTION

For improving the deficits mentioned above, the present invention proposes a transmission device for a scanner, it drives an image acquisition module to move; the device comprises a rotating wheel, a first roller, a driving roller, a conveyor and a second roller, in which the driving roller is located below the first roller; one end of the conveyor is put around the rotating wheel and another end thereof is put respectively around the first roller and the driving roller, the driving roller drives the conveyor to rotate; the second roller is pivotally connected onto a place between the rotating wheel and the driving roller and used for withstanding the conveyor between the rotating wheel and the driving roller to allow the conveyor between the rotating wheel and the second roller to be parallel to the conveyor between the rotating wheel and the first roller.

When the transmission device according to the present invention is installed in a base of the scanner, the conveyor is driven by the driving roller to drive an image acquisition module to move to allow the image acquisition module to move between the rotating wheel and the first roller to process image acquisition, and a route of the conveyor is changed by installing the first roller and the second roller to allow the image acquisition module to move to a upper side of the first roller and a starting point of the movement to be close to the rim of the base so as to reduce a distance between the image acquisition module and the base and further to attain to the base volume reducing object.

Furthermore, a size of the first roller is smaller than the one of the rotating wheel to allow the image acquisition module to be moved with the conveyor to the upper side of the first roller. Besides, the image acquisition module is allowed to move to a place closely adjacent to a rim of the base to enable no distance to exist between the image acquisition module and the base to reduce a volume of the base.

The driving roller disclosed in the present invention can further be connected to a power module used for driving the driving roller to rotate to allow the conveyor to drive the image acquisition module to move. Here, the conveyor can be a tension-adjustable belt or steel wire so that the tension adjustment spring is not needed any more.

The present invention also proposes a transmission device for a scanner installed in a base of the scanner. The transmission device comprises an image acquisition module, a rotating wheel, a first roller, a driving roller and a second roller, in which the image acquisition module is installed in the base; the rotating wheel is pivotally onto one side of the base; the first roller is pivotally connected onto one side in the base far away from the rotating wheel; the driving roller is positioned below the first roller; one end of the conveyor is put around the rotating wheel and another end thereof is put respectively around the first roller and the driving roller; the second roller is pivotally connected to a place between the rotating wheel and the driving roller and used for withstanding the conveyor between the rotating wheel and the driving roller to allow the conveyor between the rotating and the second roller to be parallel to the conveyor between the rotating wheel and the first roller.

According to the present invention, the conveyor is driven by the driving roller to drive the image acquisition module to move to allow the image acquisition module to move between the rotating wheel and the first roller to process image acquisition, and a route of the conveyor is changed by installing the first roller and the second roller to allow the image acquisition module to be moved to a upper side of the first roller and a starting point of the movement to be close to a rim of the base so as to shorten a distance between the image acquisition module and the base and further to attain to the base volume reducing object.

Furthermore, a size of the first roller is smaller than the one of the rotating wheel to allow the image acquisition module to be moved with the conveyor to the upper side of the first roller. Besides, the image acquisition module is allowed to move to a place closely adjacent to the rim of the base to enable no distance to exist between the image acquisition module and the base to reduce the volume of the base.

The driving roller disclosed in the present invention can further be connected to a power module used for driving the driving roller to rotate to allow the conveyor to drive the image acquisition module to move. Here, the conveyor can be a tension-adjustable belt or steel wire so that the tension adjustment spring is not needed any more.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
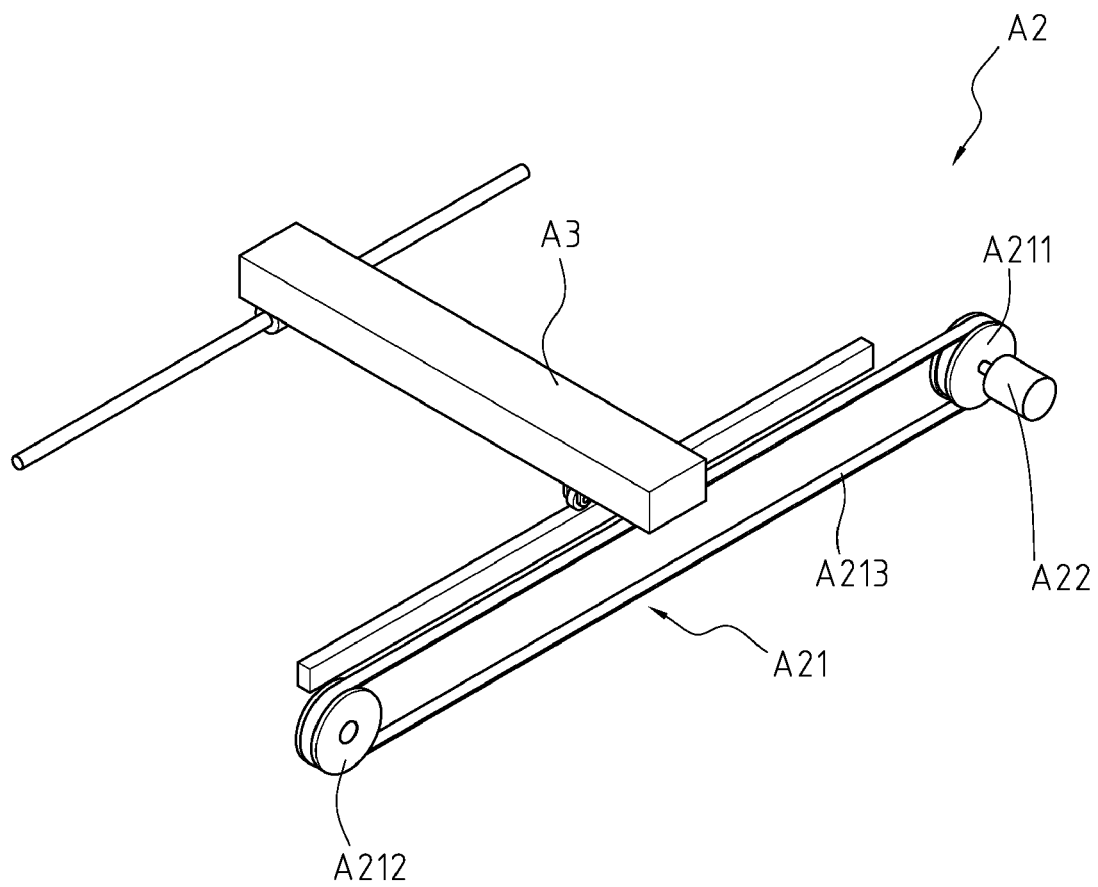
FIG. 1 is a perspective view of a transmission mechanism of a conventional scanner.
Figure 2:
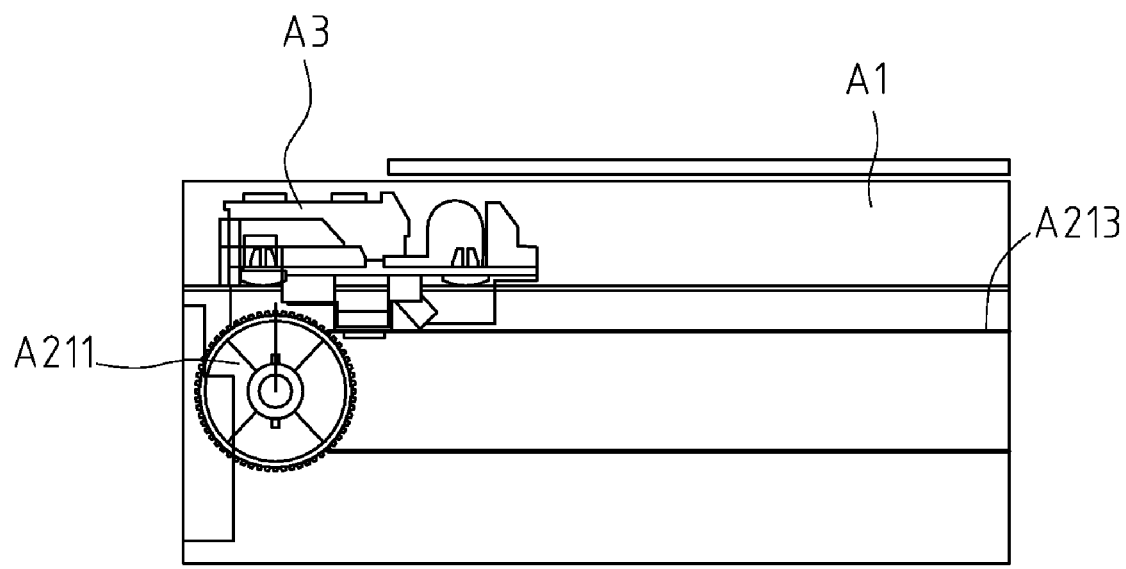
FIG. 2 is a lateral schematic view of a transmission mechanism of a conventional scanner.
Figure 3:
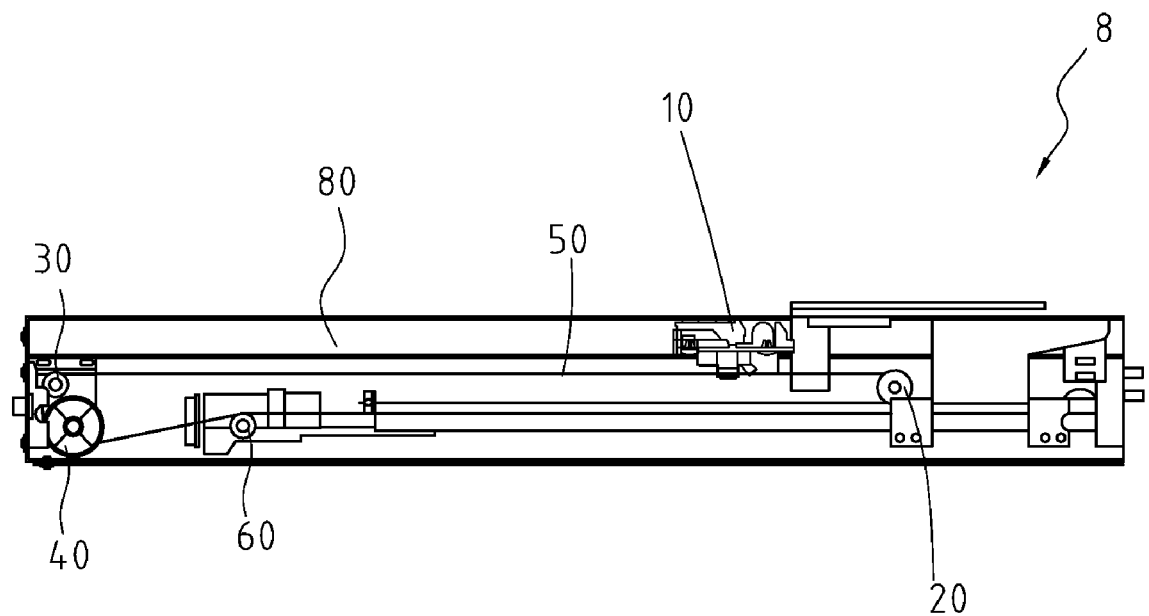
FIG. 3 is a lateral schematic view, showing a transmission device of a scanner of a preferred embodiment according to the present invention.
Figure 4:
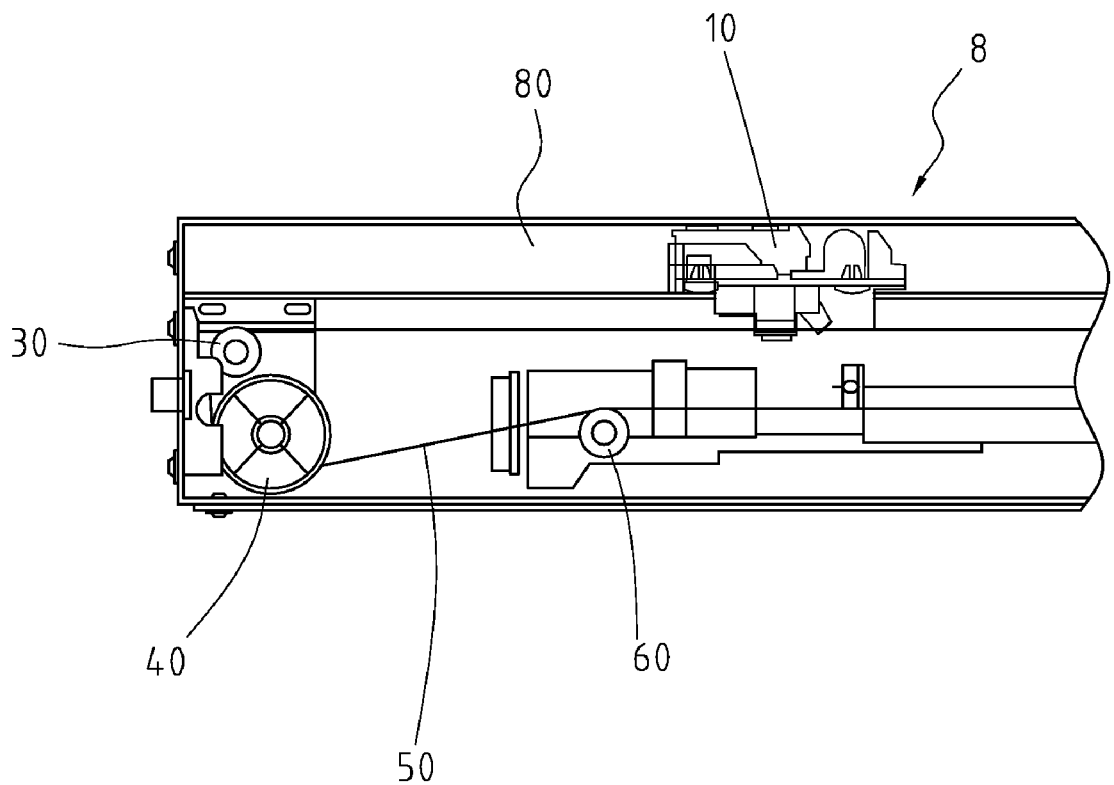
FIG. 4 is a schematic view, showing a movement of an image acquisition module of a preferred embodiment according to the present invention.
Figure 5:
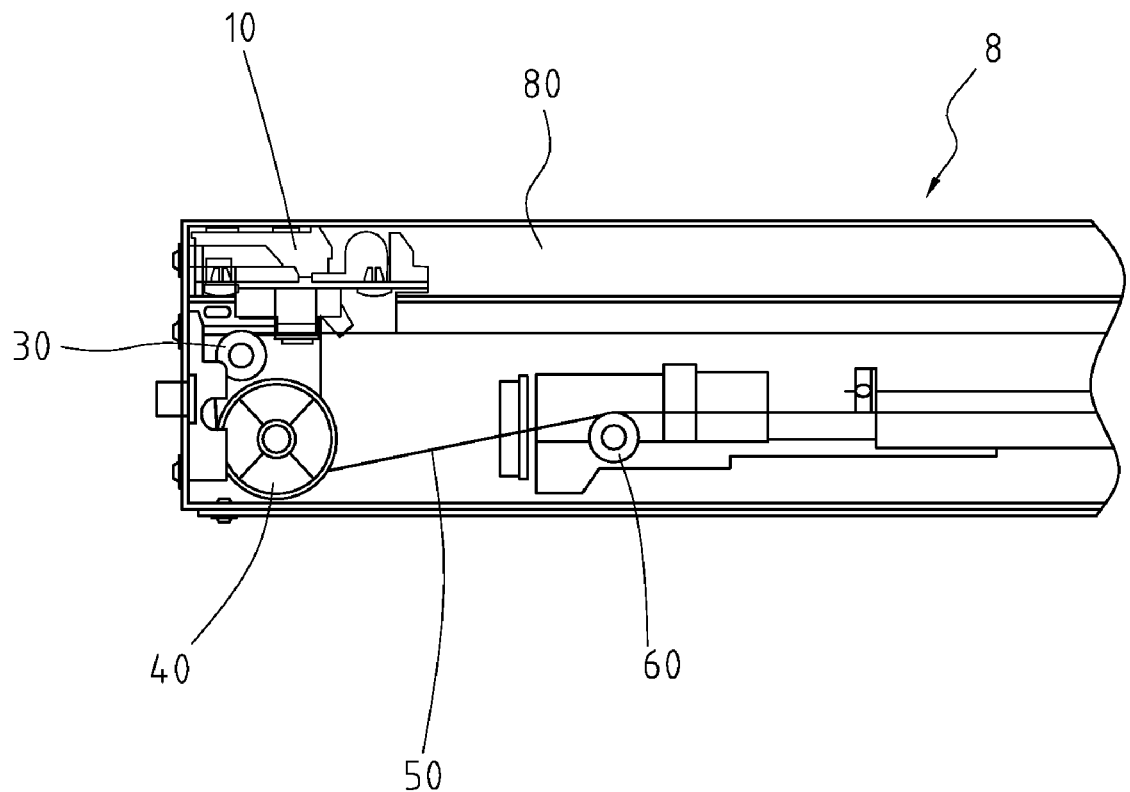
FIG. 5 is a schematic view, showing another movement of an image acquisition module of a preferred embodiment according to the present invention.

Please refer to FIGS. 3, 4 and 5. FIG. 3 is a lateral schematic view showing a transmission device of a preferred embodiment according to the present invention, FIGS. 4 and 5 respectively are a schematic view, showing a movement of an image acquisition module of a preferred embodiment according to the present invention.

A transmission device of a scanner 8 comprises an image acquisition module 10, a rotating wheel 20, a first roller 30, a driving roller 40, a conveyor 50 and a second roller 60.

The image acquisition module 10 used for picking up graphs, images and characters of a manuscript is installed in a base 80 of the scanner 8.

The rotating wheel 30 is pivotally connected onto a side wall of the base 80 of the scanner 8.

The first roller 30 is pivotally connected onto a side wall of the base 80, and the first roller 30 and the rotating wheel are respectively positioned at two opposite sides of the same wall.

The driving roller 40 is pivotally connected onto a side wall, and the driving roller 40 is positioned below the first roller 30.

As to conveyor 50, one end thereof is put around the rotating wheel 20 and another end thereof is put respectively around the first roller 30 and the driving roller 40 to allow the rotating wheel 20, the first roller 30 and the driving roller 40 to be rotated simultaneously through the conveyor 50.

The conveyor 50 mentioned above can be a belt or a steel wire. Furthermore, tension of the conveyor 50 can also be adjusted depending on practical design requirement and a tension adjustment spring is unnecessary to be further installed.

Besides, at least one fixing element is taken to couple the conveyor 50 to the image acquisition module 10, in which the fixing element is a screw used for being screwed into a screw hole disposed correspondingly on the image acquisition module 10 to allow the image acquisition module 10 to be moved when the conveyor 50 is rotated.

The second roller 60 is pivotally connected onto one side wall of the base 80 and positioned between the rotating wheel 20 and the driving roller 40. The second roller 60 is used for withstanding the conveyor between the rotating wheel 20 and the driving roller 40 to allow the conveyor 50 between the rotating wheel 20 and the first roller 30 to be raised to be parallel to the conveyor between the rotating wheel 20 and the second roller 60.

The structure disclosed by the present invention further comprises a power module installed on the base 80, power output from the power module can drive the driving roller 40 to rotate and the conveyor 50 is driven to rotate by the driving roller 40. Here, the power module can be a stepper motor or a direct current motor.

Furthermore, a size of the first roller 30 mentioned above is smaller than the one of the rotating wheel 20 and also smaller than the one of the driving roller 40, and a size of the second roller 60 is smaller than the one of the rotating wheel 20 and also smaller than the one of the driving roller 40.

Please refer to FIGS. 4 and 5 again. When the power module drives the driving roller 40 to rotate, the driving roller 40 drives the conveyor 50 to rotate, in the meantime, the image acquisition module 10 is driven to move to and fro between the rotating wheel 20 and the first roller 30 by the conveyor 50 to allow the image acquisition module 10 to pick up graphs, images and characters of a manuscript. Because the size of the first roller 30 is smaller than the one of the rotating wheel 20 and smaller than the one of the driving roller 40, it allows the image acquisition module 10 to move to a upper side to the first roller 30 and not to strike the first roller 30 or the driving roller 40. Whereby, it enables a starting point of the movement of the image acquisition module 10 to be closer to the rim of the base 80.

Moreover, the image acquisition module 10 can also be moved to a place closely adjacent to the rim of the base 80 to allow no distance to exist between the image acquisition module 10 and the base 80 so as to reduce the volume of the base 80.

A route of the conveyor 50 is changed by installing the first roller 30 and the second roller 60 according to the structure disclosed by the present invention to solve the problem that the image acquisition device of the conventional transmission mechanism cannot be too close to the active rotating wheel so as to reduce the distance between the image acquisition module 10 and the base 80 to save the space and not to allow the image acquisition module 10 to strike the first roller 30 or the driving roller 40 to attain to the base volume reducing object; this not only enables the scanner 8 to occupy a smaller space, elevates the use and the carrying convenience and enables a user to do a space disposition conveniently, but also allows an assembly of the scanner 8 to be easier and reduces assembly procedures to shorten the manufacturing time and further to attain to the product cost reducing object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmission device for a scanner, installed in a base of the scanner, said device comprising:
   an image acquisition module, disposed in said base;
   a rotating wheel, pivotally connected to a first side of said base;
   a first roller, pivotally connected to a second side of said base away from said rotating wheel, a size of the first roller being smaller than that of the rotating wheel;
   a driving roller, positioned below said first roller, a size of the driving roller being larger than that of the first roller;

a conveyor, one end thereof being put around said rotating wheel, another end thereof being put around said first roller and said driving roller; and a second roller, pivotally connected to the base and being disposed between said rotating wheel and said driving roller, for withstanding said conveyor between said rotating wheel and said driving roller to allow said conveyor between said rotating wheel and said second roller to be parallel to said conveyor between said rotating wheel and said first roller, a size of the second roller being smaller than that of the driving roller;

wherein said driving roller drives said conveyor to move said image acquisition module, and said image acquisition module is movable to an upper side of said first roller, to allow a starting point of the movement of said image acquisition module to be close to a rim of said base so as to reduce a volume of said base.

2. The transmission device for a scanner according to claim 1, wherein said driving roller is connected to a power module and used for driving said driving roller to rotate.

3. The transmission device for a scanner according to claim 1, wherein said conveyor drives said image acquisition module to move to and fro between said rotating wheel and said first roller.

4. The transmission device for a scanner according to claim 1, wherein said conveyor is connected with said image acquisition module through at least one fixing element.

5. The transmission device for a scanner according to claim 4, wherein said fixing element is a screw used for being screwed in a screw hole on said image acquisition module.

6. The transmission device for a scanner according to claim 1, wherein said conveyor is tension-adjustable.

* * * * *